Dec. 3, 1963 F. H. TENDICK, JR 3,113,273

PLURAL STAGE SELECTOR SYSTEM INCLUDING "NOT" AND "AND-NOT" CIRCUITS IN EACH STAGE THEREOF

Filed Nov. 21, 1961 2 Sheets-Sheet 1

INVENTOR.
F. H. TENDICK, JR.
BY Lucian C. Canepa

ATTORNEY

FIG. 2B
| INPUTS | | | OUTPUT |
|---|---|---|---|
| a | b | c | f |
| 0 | 0 | 0 | 1 |
| 0 | 0 | 1 | 0 |
| 0 | 1 | 1 | 0 |
| 1 | 1 | 1 | 0 |
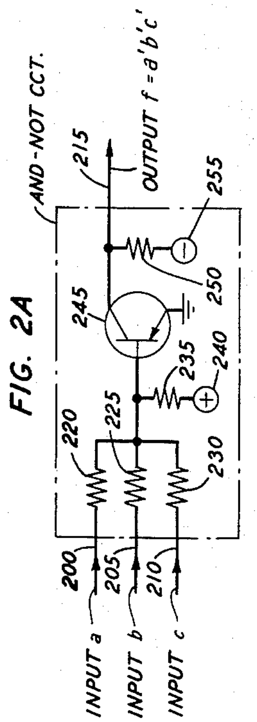
FIG. 2A
FIG. 3
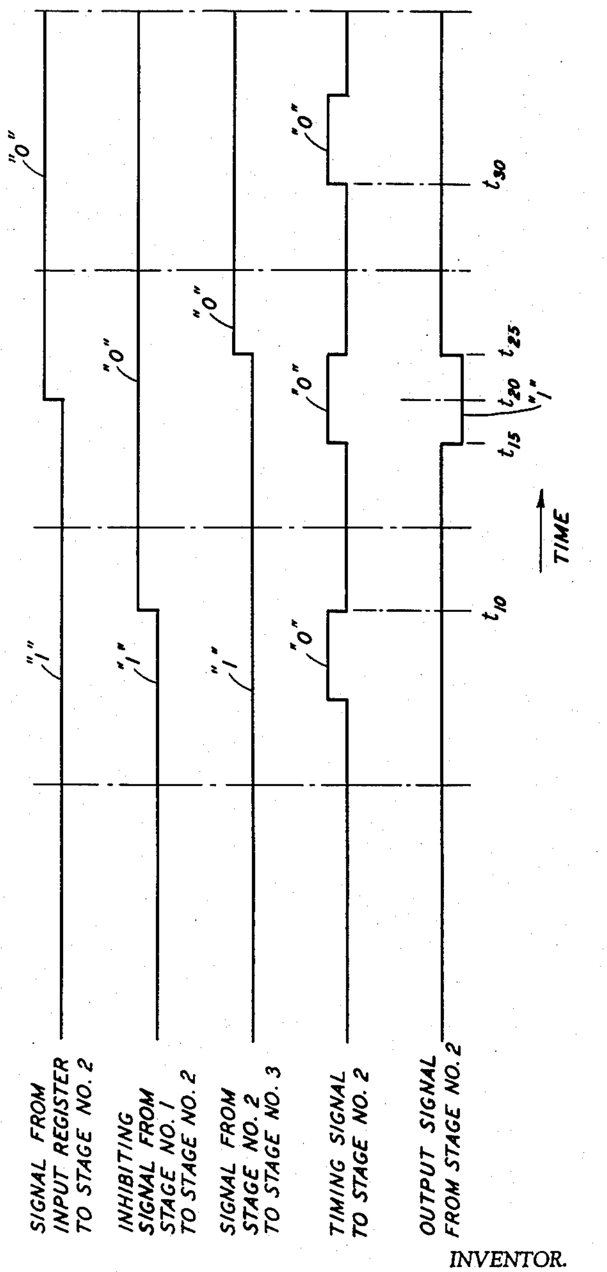
INVENTOR.
F. H. TENDICK, JR.
BY Lucian C. Canepa
ATTORNEY United States Patent Office 3,113,273
Patented Dec. 3, 1963

3,113,273
PLURAL STAGE SELECTOR SYSTEM INCLUDING "NOT" AND "AND-NOT" CIRCUITS IN EACH STAGE THEREOF

Frank H. Tendick, Jr., Middletown, N.J., assignor to Bell Telephone Laboratories, Incorporated, New York, N.Y., a corporation of New York Filed Nov. 21, 1961, Ser. No. 154,398
3 Claims. (Cl. 328—103)

This invention relates to the processing of electrical signals, and more particularly to selector systems.

A selector system performs the function of sequentially selecting in a predetermined preferential order one at a time of a plurality of input signals that are simultaneously applied thereto. An example of such a system is a conventional shift register arrangement to which signals are applied in parallel and abstracted therefrom in series under control of a timing signal source. Such a system is useful to control, time and program selectively the processing of electrical signals.

An object of the present invention is the improvement of selector systems.

More specifically, an object of this invention is the provision of selector systems which are characterized by high speed, simplicity of design and high reliability.

These and other objects of the present invention are realized in a specific illustrative system that comprises a plurality of stages each of which provides a "1" output signal only if a "1" input signal is applied thereto and if, in addition, there are no "1" input signals applied to higher preference stages of the system. Each stage includes a feedback circuit which responds to the appearance of a "1" signal at the output of the stage by causing the input signal applied thereto to change from a "1" to a "0." Also, the feedback circuit of each stage responds to a "1" output signal by creating a lockup condition in which the "1" output signal and an inhibiting signal that is coupled to lower preference stages are made to persist for a predetermined period of time.

One unique characteristic of the illustrative system is that the application of a "0" input signal to a stage causes the output of that stage to be skipped from a time standpoint. Specifically, assume a three-stage system to whose stages input signals "1," "0" and "1" are respectively applied. In such a system, a "1" signal appears at the output of the highest-ordered or first stage in approximate time coincidence with the occurrence of a first timing signal, and a "1" signal appears at the output of the lowest-ordered or third stage in approximate time coincidence with the occurrence of the second timing signal. In other words, the system need not generate three timing signals to transfer the two "1" input signals to the outputs of the three stages, only two timing signals being necessary therefor.

It is a feature of the present invention that a selector system include a plurality of stages each of which provides a "1" output signal only if a "1" input signal is applied thereto and if, in addition, there are no "1" input signals applied to higher preference stages of the system.

It is a further feature of the invention that each stage of a selector system include a feedback circuit which is responsive to the appearance of a "1" signal at the output of the stage for causing the applied input signal to change from a "1" to a "0" signal and, in addition, for causing a lockup condition in which the "1" output signal and an inhibiting signal that is coupled to lower preference stages are made to persist for a predetermined period of time.

It is still another feature of the present invention that in a selector system the number of timing signals required to sequentially select in a predetermined preferential order one at a time of a plurality of simultaneously-applied "1" and "0" input signals is equal to the number of "1" input signals.

A complete understanding of the present invention and of the above and other features and advantages thereof may be gained from a consideration of the following detailed description of an illustrative embodiment thereof presented hereinbelow in connection with the accompanying drawing, in which:

FIG. 2A shows in detail the arrangement of an illustrative AND-NOT circuit of the type included in FIG. 1;

FIG. 2B is a truth table or definitive specification for the AND-NOT circuit shown in FIG. 2A; and FIG. 3 illustrates various waveforms characteristic of the system depicted in FIG. 1.

Figure 1:
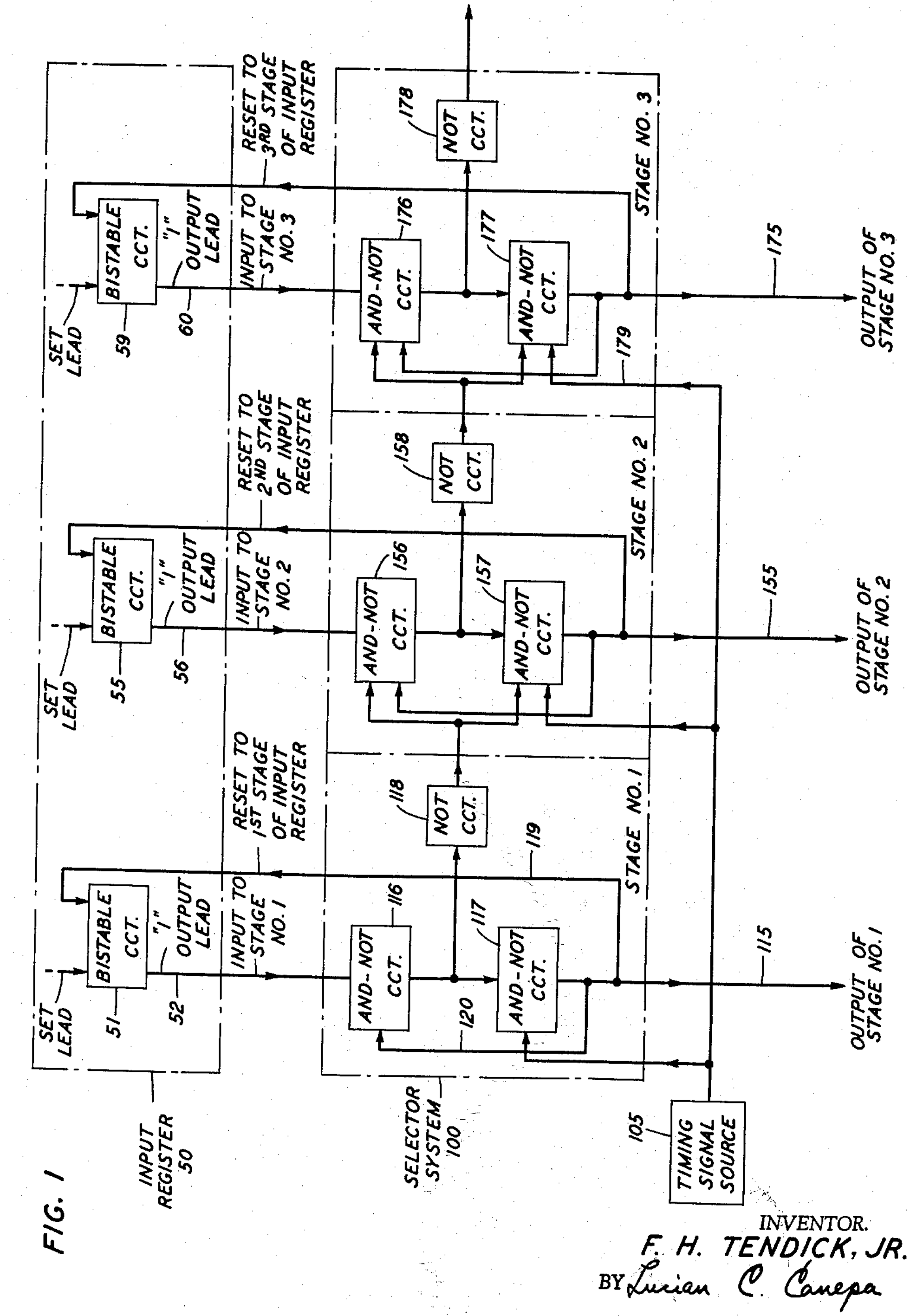
FIG. 1 depicts a specific illustrative selector system made in accordance with the principles of the present invention and, further, shows an input register associated therewith.

The description of the illustrative selector system shown in FIG. 1 will be more easily comprehended if first the nature of the component circuits thereof is considered in detail. These component circuits may be constructed in accordance with the principles of any one of several known logic technologies. Typical of these logic technologies are transistor resistor logic, which includes a basic logic circuit or building block comprising a transistor and a plurality of resistors; transistor diode logic, which includes a basic logic circuit comprising a transistor and a plurality of diodes; and low level logic, which includes a basic circuit also comprising a transistor and a plurality of diodes. Each of these technologies, as well as other known logic technologies not specifically enumerated, has advantages and disadvantages for various applications when factors such as speed of operation, power requirements, reliability, economy and simplicity of design are considered.

For illustrative purposes, emphasis herein will be directed to a specific embodiment of the present invention made from transistor resistor logic circuits. The basic building block of this technology is shown in FIG. 2A. Furthermore, a general description of transistor resistor logic is contained in "Transistor NOR Circuit Design" by W. D. Rowe and G. H. Royer, volume 76, part I, Transactions of the American Institute of Electrical Engineers, Communications and Electronics, July 1957, pages 263–267.

The logic circuit shown in FIG. 2A includes three leads 200, 205 and 210 to which are coupled input signals $a$, $b$ and $c$, respectively, whereby there is provided on a lead 215 an output signal $f$. The circuit also includes input resistors 220, 225 and 230, a base resistor 235, a positive bias source 240, a PNP transistor 245, a collector resistor 250 and a negative bias source 255.

If a voltage near ground potential is assumed to represent the binary value "0," and if a high negative voltage is designated "1," the circuit of FIG. 2A performs the function of providing on the output lead 215 thereof a "0" signal if a "1" signal is applied to any one or more of the input leads 200, 205 and 210. On the other hand, a "1" output signal results only if every one of the leads 200, 205 and 210 has a "0" signal coupled thereto. In Boolean algebra terms, $f=a'b'c'$. Such a configuration is commonly referred to as an AND-NOT circuit, and the truth table or definitive specification therefor for certain selected combinations of input signals is shown in FIG. 2B.

If two of the three input leads 200, 205 and 210 of the circuit shown in FIG. 2A are permanently grounded, the resulting one-input circuit performs the function of inversion. That is, a "1" output signal results in response to the application to the circuit of a "0" input signal and a "0" output signal results in response to a "1" input signal. Such a configuration is commonly designated a NOT circuit.

Referring now to FIG. 1, there is shown a specific selector system 100 which illustratively embodies the principles of the present invention. Shown associated with the selector system is an input register 50 from which signals are respectively applied in parallel to the stages of the system. In response to such input signals and to timing signals applied from a source 105, the depicted system provides output signals in a predetermined preferential order on leads 115, 155 and 175.

Stage No. 1 of the illustrative system 100 shown in FIG. 1 is the highest-ordered or most preferred stage of the system. Hence, if, for example, "1" signals are applied from the register 50 to stage No. 1 and to one or more other stages, a "1" output signal appears on the lead 115 emanating from stage No. 1 before a "1" signal appears on any of the other output leads 155 and 175. Stage No. 3, it is noted, is the lowest-ordered or least preferred stage of the illustrative system. Thus, the application of a "1" signal to stage No. 3 does not provide a "1" on its output lead 175 until all other applied "1" input signals have appeared at the outputs of their respective higher-ordered stages.

To facilitate an understanding of the operation of the illustrative selector system 100 shown in FIG. 1, let us consider a specific example. Assume that each of bistable circuits 51, 55 and 59 in the input register 50 is set by circuitry (not shown) to its "1" state. As a result, the potential of the "1" output lead 52 of the circuit 51 is negative with respect to ground. Similarly, the potential of each of the leads 56 and 60 associated with the circuits 55 and 59, respectively, is under such conditions also negative with respect to ground. Accordingly, in the example, "1" input signals are respectively applied in parallel from the register 50 to the stages of the system 100.

Assume further that under such conditions a first "0" timing signal is applied by the source 105 to each of the stages of the illustrative selector system 100. Now consider which, if any, of the stages provides a "1" output signal in approximate time coincidence with the application of the first timing signal. Consider first stage No. 3 which comprises AND-NOT circuits 176 and 177 and NOT circuit 178. The circuit 176 has applied thereto a "1" signal via the input lead 60. Therefore, as is evident from the truth table shown in FIG. 2B, the output of the circuit 176 is a "0" signal, which is applied to the circuits 177 and 178. The circuit 178 inverts this "0" signal to provide an inhibiting "1" signal which is available to be applied to other lower preference stages (not shown).

In the assumed example, the output AND-NOT circuit 177 in stage No. 3 has a "0" signal applied thereto from the input AND-NOT circuit 176 and, in addition, has a "0" timing signal applied thereto via lead 179. Accordingly, whether the output of the circuit 177 is a "0" or a "1" signal depends respectively on whether the other input signal applied thereto is a "1" or a "0." This other input signal comes from the output of NOT circuit 158 in stage No. 2. By means of exactly the same reasoning by which it was shown above that the output of the NOT circuit 178 in stage No. 3 is a "1" signal, it is apparent, for the case of three simultaneously-applied "1" input signals, that the output of the NOT circuit 158 is also a "1" signal. As noted above, this "1" signal inhibits the output of the AND-NOT circuit 177. As a result, the signal which appears on the lead 175 of stage No. 3 in approximate time coincidence with the appearance of the first "0" timing signal is a "0" output signal. In other words the "1" signal applied as an input to stage No. 3 is not transferred to the output lead 175 during the first timing interval.

By exactly similar reasoning, it can be shown that due to the presence of a "1" inhibiting signal at the output of NOT circuit 118 in stage No. 1, a "1" signal does not appear on the output lead 155 of stage No. 2 during the first timing interval. Instead, a "0" output signal appears on the lead 155 in response to the application to the stage of the first "0" timing signal.

On the other hand, AND-NOT circuit 117 in stage No. 1 has applied thereto as inputs during the first timing interval only two signals, viz., the first "0" timing signal and, in addition, a "0" signal from AND-NOT circuit 116. Accordingly, the circuit 117 provides a "1" signal on the output lead 115 in response to the application to the stages of the first "0" timing signal. This "1" output signal appearing on the lead 115 is coupled via lead 119 to reset the bistable circuit 51 to its "0" state. As a result of this change of state, a "0" signal is applied by the circuit 51 via the lead 52 to the AND-NOT circuit 116. The output of the circuit 116 remains a "0" signal, however, due to the fact that the "1" output signal appearing on the lead 115 is coupled via lead 120 to one input terminal of the circuit 116. Hence as long as the "1" output signal persists on the lead 115, the output of the circuit 116 is locked up at "0" and the output of the NOT circuit 118 is maintained as an inhibiting "1" signal that is applied to the lower preference stages of the system. In turn, the "1" signal appearing on the output lead 115 of stage No. 1 persists for a period which coincides with the duration of the first "0" timing signal from the source 105. This is so because the AND-NOT circuit 117 has only two inputs, one being the "0" timing signal and the other being the locked-up "0" output signal of the circuit 116.

The time designated $t_{10}$ on the abscissa of FIG. 3 marks the trailing edge of the first "0" timing signal applied from the source 105 to the stages of the illustrative selector system 100. Accordingly, at time $t_{10}$, the output of the AND-NOT circuit 117 becomes a "0" and the signal fed back to the circuit 116 via the lead 120 becomes a "0" signal. As a result, the output of the circuit 116 becomes a "1" and the inhibiting signal supplied by the NOT circuit 118 to stage No. 2 becomes at that time an unblocking or "0" signal, as indicated in the second row of FIG. 3.

Hence, when at a later time $t_{15}$ (FIG. 3), second "0" timing signal is applied from the source 105 to stages 1, 2, and 3, the inputs to the AND-NOT circuit 156 are (1) a "1" signal from the bistable circuit 55, (2) a "0" inhibiting signal from stage No. 1 and (3) a "0" signal from the output lead 155. Accordingly, the circuit 156 provides at its output a "0" signal, which is inverted by the circuit 158 to supply a "1" signal to lower preference stages to inhibit their applied input signals from being transferred to their respective output leads.

At time $t_{15}$ the AND-NOT circuit 157 in stage No. 2 has applied thereto as inputs (1) a "0" control signal from the circuit 156, (2) a "0" inhibiting signal from stage No. 1 and (3) a "0" timing signal. Accordingly, stage No. 2 responds to the second timing signal and to the fact that its associated bistable circuit 55 is applying a "1" signal thereto by providing a "1" signal on the output lead 155, as indicated in the bottom row of FIG. 3. Some time subsequent to $t_{15}$, at the time marked $t_{20}$ in FIG. 3, the bistable circuit 55 is reset to its "0" state by the "1" signal appearing on the output lead 155, as indicated in the top row of FIG. 3. However, because of the feedback signal coupled from the output lead 155 to the AND-NOT circuit 156, the control signal at the output of the circuit 156 persists as a "0" representation, whereby a "1" inhibiting signal continues to be applied by the NOT circuit 158 to stage No. 3. In addition, the output of the AND-NOT circuit 157 is thereby maintained as a "1" signal as long as the "0" timing signal persists. It is therefore obvious that the width of the output signal appearing on leads 115, 155 and 175 can be easily controlled by varying the duration of the timing signals supplied by the source 105.

At time $t_{25}$ (FIG. 3), the trailing edge of the second "0" timing signal occurs. In approximate time coincidence therewith the signal appearing on the output lead 155 switches from a "1" to a "0" representation and the inhibiting signal applied from stage No. 2 to stage No. 3 also switches from a "1" to a "0" representation. Accordingly, when at time $t_{30}$ the third "0" timing signal is applied to the stages of the system 100, stage No. 3 is not inhibited by a signal from stage No. 2 and, as a result, the "1" signal applied from the bistable circuit 59 as an input to stage No. 3 is transferred to the output lead 175. The operation of stage No. 3 is identical to that described above for stage No. 2.

Thus it has been shown by means of a specific example that the selector system 100 shown in FIG. 1 responds to three simultaneously-applied "1" signals by respectively providing three "1" signals in sequence on the output leads 115, 155 and 175.

Another specific example will serve to demonstrate one particularly unique characteristic of the illustrative system 100. Assume that the signals applied by the bistable circuits 51, 55 and 59 in the input register 50 to stages 1, 2 and 3 have the values "1," "0" and "1" respectively. In accordance with the mode of operation described in detail above, the "1" signal applied to stage No. 1 (the highest-ordered stage) is transferred to the output lead 115 in approximate time coincidence with the occurrence of the first "0" timing signal. During the existence of the first timing signal the NOT circuit 118 in stage No. 1 supplies a "1" inhibiting signal to stage No. 2. Furthermore, a "1" inhibiting signal is applied via the circuits 156 and 158 to stage No. 3. However, as soon as the first "0" timing signal terminates, the inhibiting signal output of the NOT circuit 118 switches to a "0" value and, as a result the inhibiting signal applied to stage No. 3 from the NOT circuit 158 also switches to a "0" value, whereby both stages 2 and 3 are unblocked prior to the application to the system of the second "0" timing signal. As noted above, stage No. 2 has a "0" signal applied thereto from the input register 50, while stage No. 3 has a "1" input signal applied thereto. Hence, in approximate time coincidence with the occurrence of the second timing signal, the "1" input signal applied to unblocked stage No. 3 is transferred to its output lead 175. Thus it is seen that the number of timing signals required to selectively transfer a plurality of "1" input signals to the output leads of the illustrative system is equal to the number of "1" signals actually applied to the system rather than to the number of input leads included in the system.

It is noted that detailed configurations for the circuits 51, 55, 59 and 105 shown in FIG. 1 have not been presented herein, as the detailed structures of these circuits are considered, in view of the functional requirements therefor set forth hereinabove, to be clearly within the skill of the art.

It is emphasized that although particular attention herein has been directed to an illustrative system made from transistor resistor logic circuits, various other logic technologies are available and suitable for implementing the component circuits of the system 100 depicted in FIG. 1.

Additionally, although only a three-stage system has been described and depicted in FIG. 1, it is clear that the principles of the present invention extend to an $n$-stage selector system. As the number of stages is increased, a point may be reached at which the time required for an inhibiting signal to propagate through successive stages becomes undesirably long. In such a case it is useful to add leads to the system to couple the output of the NOT circuit of each stage to the input AND-NOT circuit in a nonadjacent stage, the connections between the NOT circuit of each stage and the input and output AND-NOT circuits in the adjacent stage remaining exactly as described above. In this way the effective time required to propagate an inhibiting signal through a large number of stages is significantly reduced.

Furthermore, it is to be understood that the above-described arrangements are only illustrative of the application of the principles of the present invention. Numerous other arrangements may be devised by those skilled in the art without departing from the spirit and scope of the invention.

What is claimed is:

1. In combination in a preferential selector system, a plurality of stages arranged in order of preference in a linear array, means for simultaneously applying respective input signals to said stages, a source of serial "0" timing signals, each stage including first means responsive to a "1" input signal applied thereto for providing an inhibiting signal, said first means of each stage being also responsive to an inhibiting signal from an adjacent higher-ordered stage for providing said inhibiting signal, said first means in each stage including a first AND-NOT circuit having input and output terminals and a NOT circuit having a single input terminal connected to the output terminal of said first AND-NOT circuit, said NOT circuit in each stage except the lowest-ordered stage of said array having a single output terminal connected to an input terminal of the first AND-NOT circuit in the adjacent lower-ordered stage of said array for supplying an inhibiting signal to said first AND-NOT circuit, said means for applying input signals including an input register having a plurality of bistable circuits whose output terminals are respectively connected to the input terminals of said first AND-NOT circuits in said stages, each stage including second means responsive to the simultaneous occurrence of (1) a timing signal (2) a control signal from said first means indicative of a "1" input signal and (3) the absence of an inhibiting signal from a higher-ordered stage for providing a "1" output signal, and third means responsive to the appearance of a "1" signal at the output of a stage for causing the input signal applied to the stage to be changed to a "0" indication and for causing the "1" output signal and the inhibiting signal from the stage to persist for the duration of the timing signal.

2. A combination as in claim 1 wherein said second means in each stage includes a second AND-NOT circuit having an input terminal connected to the output terminal of said first AND-NOT circuit.

3. A combination as in claim 2 wherein said third means in each stage comprises a feedback path which interconnects the output terminal of said second AND-NOT circuit to a reset terminal of the bistable circuit that is connected to said stage and also to an input terminal of said first AND-NOT circuit.

References Cited in the file of this patent

UNITED STATES PATENTS

| | | |
|---|---|---|
| 2,719,773 | Karnaugh | Oct. 4, 1955 |
| 2,964,735 | Abbott | Dec. 13, 1960 |
| 2,991,449 | Lee | July 4, 1961 |
| 3,050,713 | Harmon | Aug. 21, 1962 |